US012065173B2

(12) United States Patent
Tariq et al.

(10) Patent No.: US 12,065,173 B2
(45) Date of Patent: Aug. 20, 2024

(54) SYSTEM AND METHODS FOR SPEED AND LANE ADVISORY IN EVALUATING LANE CHANGE EVENTS AND OPPORTUNITIES

(71) Applicant: Honda Motor Co., Ltd., Tokyo (JP)

(72) Inventors: Faizan M. Tariq, San Jose, CA (US); David F. Isele, San Jose, CA (US); Sangjae Bae, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 206 days.

(21) Appl. No.: 17/707,792

(22) Filed: Mar. 29, 2022

(65) Prior Publication Data

US 2023/0311949 A1    Oct. 5, 2023

(51) Int. Cl.
*B60W 60/00*     (2020.01)
*B60W 40/105*    (2012.01)

(52) U.S. Cl.
CPC .... *B60W 60/00274* (2020.02); *B60W 40/105* (2013.01); *B60W 60/00272* (2020.02);
(Continued)

(58) Field of Classification Search
CPC ..... B60W 60/00274; B60W 60/00272; B60W 40/105; B60W 2554/4041;
(Continued)

(56) References Cited

U.S. PATENT DOCUMENTS 7,893,819 B2 * 2/2011 Pfeiffer ................ B62D 15/029
340/435

10,011,281 B1 * 7/2018 Kang ............. B60W 30/18163
(Continued)

FOREIGN PATENT DOCUMENTS

| CN | 107161155 A | * | 9/2017 | ............ B60W 40/09 |
| CN | 110941901 B | * | 6/2023 | ............ B60W 30/16 |
| RU | 2624392 C1 | * | 7/2017 | ............ B60W 30/16 |

OTHER PUBLICATIONS

R. Attia, R. Orjuela, and M. Basset, "Combined longitudinal and lateral control for automated vehicle guidance," Vehicle System Dynamics, vol. 52, No. 2, pp. 261-279, 2014.
(Continued)

*Primary Examiner* — Richard A Goldman
(74) *Attorney, Agent, or Firm* — RANKIN, HILL & CLARK LLP (57) ABSTRACT

Systems and methods for speed and lane advisory are provided. In one embodiment, a method includes determining a host longitudinal position in a current lane. The method includes identifying at least one candidate lane adjacent the current lane. The method includes calculating a longitudinal maneuver distance for the host agent to execute a maneuver from the current lane to a candidate. The method includes calculating an augmented minimum distance by combining a predetermined minimum distance and the longitudinal maneuver distance. The method includes calculating a current lane headway distance for the current lane and a first candidate lane headway distance for the first candidate lane. The method includes selecting a target lane from a current lane or a candidate lane based on a comparison of the current lane headway distance and the first candidate lane headway distance and controlling the host agent based on the selection of the target lane.

20 Claims, 4 Drawing Sheets

(52) U.S. Cl.
CPC . *B60W 2552/53* (2020.02); *B60W 2554/4041* (2020.02); *B60W 2554/4042* (2020.02); *B60W 2554/4045* (2020.02); *B60W 2554/4049* (2020.02)

(58) Field of Classification Search
CPC ..... B60W 2552/53; B60W 2554/4042; B60W 2554/4045; B60W 2554/4049
USPC .......................................................... 701/23
See application file for complete search history.

(56) References Cited

U.S. PATENT DOCUMENTS

| | | | |
|---|---|---|---|
| 10,317,902 B2* | 6/2019 | Nilsson | B60W 30/18163 |
| 11,183,066 B2* | 11/2021 | Sohn | G06V 40/20 |
| 2019/0172355 A1* | 6/2019 | Stock | B60W 30/14 |
| 2021/0300418 A1* | 9/2021 | Alvarez | G08G 1/161 |
| 2022/0402486 A1* | 12/2022 | Rahman | B60W 30/16 |
| 2023/0031030 A1* | 2/2023 | Park | B60W 30/16 |
| 2023/0126172 A1* | 4/2023 | Zhang | B60K 37/00 701/23 |
| 2023/0278584 A1* | 9/2023 | Pyun | B60W 50/14 701/23 |
| 2023/0311949 A1* | 10/2023 | Tariq | B60W 60/00274 701/23 |
| 2023/0373476 A1* | 11/2023 | Ho | B60W 50/14 |

OTHER PUBLICATIONS

S. Bae, D. Isele, K. Fujimura, and S. J. Moura, "Risk-aware lane selection on highway with dynamic obstacles," in 2021 IEEE Intelligent Vehicles Symposium (IV). IEEE, 2021, pp. 652-659.
S. Bae, D. Saxena, A. Nakhaei, C. Choi, K. Fujimura, and S. Moura, "Cooperation-aware lane change maneuver in dense traffic based on model predictive control with recurrent neural network," in 2020 American Control Conference (ACC). IEEE, 2020, pp. 1209-1216.
Y. Chen, C. Hu, and J. Wang, "Motion planning with velocity prediction and composite nonlinear feedback tracking control for lane-change strategy of autonomous vehicles," IEEE Transactions on Intelligent Vehicles, vol. 5, No. 1, pp. 63-74, 2019.
B. Cuteri, C. Dodaro, F. Ricca, and P. Schüller, "Constraints, lazy constraints, or propagators in asp solving: An empirical analysis," Theory and Practice of Logic Programming, vol. 17, No. 5-6, pp. 780-799, 2017.
P. Falcone, F. Borrelli, J. Asgari, H. E. Tseng, and D. Hrovat, "Predictive active steering control for autonomous vehicle systems," IEEE Transactions on Control Systems Technology, vol. 15, No. 3, pp. 566-580, 2007.
A. Dosovitskiy, G. Ros, F. Codevilla, A. Lopez, and V. Koltun, "Carla: An open urban driving simulator," in Conference on robot learning. PMLR, 2017, pp. 1-16.
G. Franze and W. Lucia, "A receding horizon control strategy for autonomous vehicles in dynamic environments," IEEE Transactions on Control Systems Technology, vol. 24, No. 2, pp. 695-702, 2015.
S. Glaser, B. Vanholme, S. Mammar, D. Gruyer, and L. Nouveliere, "Maneuver-based trajectory planning for highly autonomous vehicles on real road with traffic and driver interaction," IEEE Transactions on Intelligent Transportation Systems, vol. 11, No. 3, pp. 589-606, 2010.

A. Gupta, J. Johnson, L. Fei-Fei, S. Savarese, and A. Alahi, "Social gan: Socially acceptable trajectories with generative adversarial networks," in Proceedings of the IEEE conference on computer vision and pattern recognition, 2018, pp. 2255-2264.
L. Gurobi Optimization, "Gurobi optimizer reference manual," 2021. [Online]. Available: http://www.gurobi.com.
C.-J. Hoel, K. Wolff, and L. Laine, "Automated speed and lane change decision making using deep reinforcement learning," in 2018 21st International Conference on Intelligent Transportation Systems (ITSC). IEEE, 2018, pp. 2148-2155.
M. Kaushik, V. Prasad, K. M. Krishna, and B. Ravindran, "Overtaking maneuvers in simulated highway driving using deep reinforcement learning," in 2018 IEEE Intelligent Vehicles Symposium (IV), 2018, pp. 1885-1890.
A. Kesting, M. Treiber, and D. Helbing, "General lane-changing model mobil for car-following models," Transportation Research Record, vol. 1999, No. 1, pp. 86-94, 2007. [Online]. Available: https://doi.org/10.3141/1999-10.
W. Khaksar, K. S. M. Sahari, and T. S. Hong, "Application of sampling-based motion planning algorithms in autonomous vehicle navigation," Autonomous Vehicle, vol. 735, 2016.
Y. Kuwata, J. Teo, G. Fiore, S. Karaman, E. Frazzoli, and J. P. How, "Real-time motion planning with applications to autonomous urban driving," IEEE Transactions on control systems technology, vol. 17, No. 5, pp. 1105-1118, 2009.
S. Lefèvre, D. Vasquez, and C. Laugier, "A survey on motion prediction and risk assessment for intelligent vehicles," ROBOMECH journal, vol. 1, No. 1, pp. 1-14, 2014.
G. Liu, S. Chen, Z. Zeng, H. Cui, Y. Fang, D. Gu, Z. Yin, and Z. Wang, "Risk factors for extremely serious road accidents: Results from national road accident statistical annual report of china," PLoS one, vol. 13, No. 8, p. e0201587, 2018.
C. Liu, S. Lee, S. Varnhagen, and H. E. Tseng, "Path planning for autonomous vehicles using model predictive control," in 2017 IEEE Intelligent Vehicles Symposium (IV). IEEE, 2017, pp. 174-179.
H. Marchand, A. Martin, R. Weismantel, and L. Wolsey, "Cutting planes in integer and mixed integer programming," Discrete Applied Mathematics, vol. 123, No. 1-3, pp. 397-446, 2002.
K. Okamoto, K. Berntorp, and S. Di Cairano, "Similarity-based vehicle-motion prediction," in 2017 American Control Conference (ACC). IEEE, 2017, pp. 303-308.
B. Paden, M. Čáp, S. Z. Yong, D. Yershov, and E. Frazzoli, "A survey of motion planning and control techniques for self-driving urban vehicles," IEEE Transactions on intelligent vehicles, vol. 1, No. 1, pp. 33-55, 2016.
C. Pek, P. Zahn, and M. Althoff, "Verifying the safety of lane change maneuvers of self-driving vehicles based on formalized traffic rules," in Proc. of the IEEE Intelligent Vehicles Symposium, 2017.
A. Richards and J. How, "Mixed-integer programming for control," in Proceedings of the 2005, American Control Conference, 2005., 2005, pp. 2676-2683 vol. 4.
D. M. Saxena, S. Bae, A. Nakhaei, K. Fujimura, and M. Likhachev, "Driving in dense traffic with model-free reinforcement learning," in 2020 IEEE International Conference on Robotics and Automation (ICRA). IEEE, 2020, pp. 5385-5392.
G. Schildbach and F. Borrelli, "Scenario model predictive control for lane change assistance on highways," in 2015 IEEE Intelligent Vehicles Symposium (IV). IEEE, 2015, pp. 611-616.
F. M. Tariq, N. Suriyarachchi, C. Mavridis, and J. S. Baras, "Autonomous vehicle overtaking in a bidirectional mixed-traffic setting," in 2022 American Control Conference (ACC), 2022.

\* cited by examiner

FIG. 4

SYSTEM AND METHODS FOR SPEED AND LANE ADVISORY IN EVALUATING LANE CHANGE EVENTS AND OPPORTUNITIES

BACKGROUND

Modeling traffic participants is a complex task that has garnered significant research attention throughout the past decades. This interest is fueled by the constant growth of cities and corresponding increase in traffic on roadways in and around the cities. This interest is further fueled as autonomous vehicles become more prevalent on the roadways. Generating safe and efficient behaviors, such as a lane change, for an autonomous vehicle requires an ability to model how other traffic participants will behave since the behavior of a traffic participant depends on the behavior of surrounding traffic participants.

BRIEF DESCRIPTION

According to one aspect, a system for speed and lane advisory is provided. The system includes a memory storing instructions for execution by a processor. When executed by the processor, the instructions cause the processor to determine a host longitudinal position for a host agent for a first time. The host agent is traveling in a current lane of a roadway. The first time is a time step after a current time. The instructions also cause the processor to identify at least one candidate lane adjacent the current lane on the roadway. The at least one candidate lane travels in the same longitudinal direction as the current lane. The at least one candidate lane includes a first candidate lane. The instructions further cause the processor to calculate a longitudinal maneuver distance for the host agent to execute a maneuver from the current lane to a candidate lane of the at least one candidate lane based on a speed of the host agent and a duration of the time step. The instructions yet further cause the processor to calculate an augmented minimum distance by combining a predetermined minimum distance and the longitudinal maneuver distance. The instructions cause the processor to calculate a current lane headway distance for the current lane based on a presence of a current lane preceding proximate agent in the current lane and the augmented minimum distance. The instructions also cause the processor to calculate a first candidate lane headway distance for the first candidate lane based on a presence of a first candidate preceding proximate agent in the first candidate lane and the augmented minimum distance. The instructions further cause the processor to select a target lane from a current lane or a candidate lane of the at least one candidate lane for the first time based on a comparison of the current lane headway distance and the first candidate lane headway distance. The instructions yet further cause the processor to control the host agent based on the selection of the target lane.

According to another aspect, a computer-implemented method for speed and lane advisory is provided. The computer-implemented method includes determining a host longitudinal position for a host agent for a first time. The host agent is traveling in a current lane of a roadway. The first time is a time step after a current time. The computer-implemented method also includes identifying at least one candidate lane adjacent the current lane on the roadway. The at least one candidate lane travels in the same longitudinal direction as the current lane. The at least one candidate lane includes a first candidate lane. The computer-implemented method further includes calculating a longitudinal maneuver distance for the host agent to execute a maneuver from the current lane to a candidate lane of the at least one candidate lane based on a speed of the host agent and a duration of the time step. The computer-implemented method yet further includes calculating an augmented minimum distance by combining a predetermined minimum distance and the longitudinal maneuver distance. The computer-implemented method includes calculating a current lane headway distance for the current lane based on a presence of a current lane preceding proximate agent in the current lane and the augmented minimum distance. The computer-implemented method also includes calculating a first candidate lane headway distance for the first candidate lane based on a presence of a first candidate preceding proximate agent in the first candidate lane and the augmented minimum distance. The computer-implemented method further includes selecting a target lane from a current lane or a candidate lane of the at least one candidate lane for the first time based on a comparison of the current lane headway distance and the first candidate lane headway distance. The computer-implemented method yet further includes controlling the host agent based on the selection of the target lane.

According to a further aspect, a non-transitory computer readable storage medium storing instructions that when executed by a computer having a processor to perform a method for speed and lane advisory is provided. The method includes determining a host longitudinal position for a host agent for a first time. The host agent is traveling in a current lane of a roadway. The first time is a time step after a current time. The method also includes identifying at least one candidate lane adjacent the current lane on the roadway. The at least one candidate lane travels in the same longitudinal direction as the current lane. The at least one candidate lane includes a first candidate lane. The method further includes calculating a longitudinal maneuver distance for the host agent to execute a maneuver from the current lane to a candidate lane of the at least one candidate lane based on a speed of the host agent and a duration of the time step. The method yet further includes calculating an augmented minimum distance by combining a predetermined minimum distance and the longitudinal maneuver distance. The method includes calculating a current lane headway distance for the current lane based on a presence of a current lane preceding proximate agent in the current lane and the augmented minimum distance. The method also includes calculating a first candidate lane headway distance for the first candidate lane based on a presence of a first candidate preceding proximate agent in the first candidate lane and the augmented minimum distance. The method further includes selecting a target lane from a current lane or a candidate lane of the at least one candidate lane for the first time based on a comparison of the current lane headway distance and the first candidate lane headway distance. The method yet further includes controlling the host agent based on the selection of the target lane.

DETAILED DESCRIPTION

As discussed above, modeling traffic participants is a complex task. Predicting behaviors for an autonomous agent requires an ability to model how other traffic participants will behave. Since the behavior of a host agent depends on the behavior of surrounding proximate agents as well as the host agent, the population of agents may be modeled by modeling each agent in the population. For example, in a vehicular embodiment, the host agent is a host vehicle that traverses a roadway in at least a partially autonomous manner. To operate, the host vehicle may model the behavior of other vehicles on the roadway.

Typically, given an instantaneous roadway scenario, a host agent may attempt to move from a current lane to an alternative lane in an attempt to minimize travel time or move out from behind a preceding agent in the current lane. However, it may be counterproductive for the host agent to move to the alternative lane if there is a slow-moving agent traveling in the alternative lane even though there is a greater headway presently. This simple scenario highlights the importance of foresight and a long planning horizon for strategic decision-making deployed on the host agent.

Sampling-based approaches for strategic decision-making may result in an uncomfortable driving experience as the sampling-based approach attempts to react to concatenation of individual trajectories. Furthermore, sampling-based approaches suffer from high sample complexity during real-world implementation. Learning-based approaches for strategic decision-making also have concerns regarding real-world implementation due to the large amount of training data that they require, the exploration of behaviors during training, and a general inability to handle edge cases.

Here, the systems and methods for speed and lane advisory may operate at a low frequency with a long planning horizon while employing a low-fidelity dynamical model. In particular, the strategic decision-making utilizes a receding horizon mixed integer optimization to reduce travel time while accounting for passenger comfort. The computational complexity of modeling a number of agents on a multi-lane roadway is reduced by replacing integer variables with binary variables. The long planning horizon for the strategic decision-making gives the host agent the ability to proactively anticipate and handle challenging driving situations without becoming bogged down in computational complexity.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein are machines that move through or manipulate an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device"

additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/ or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. Further, the term "vehicle" may refer to an electric vehicle (EV) that is powered entirely or partially by one or more electric motors powered by an electric battery.

I. System Overview

Figure 1:
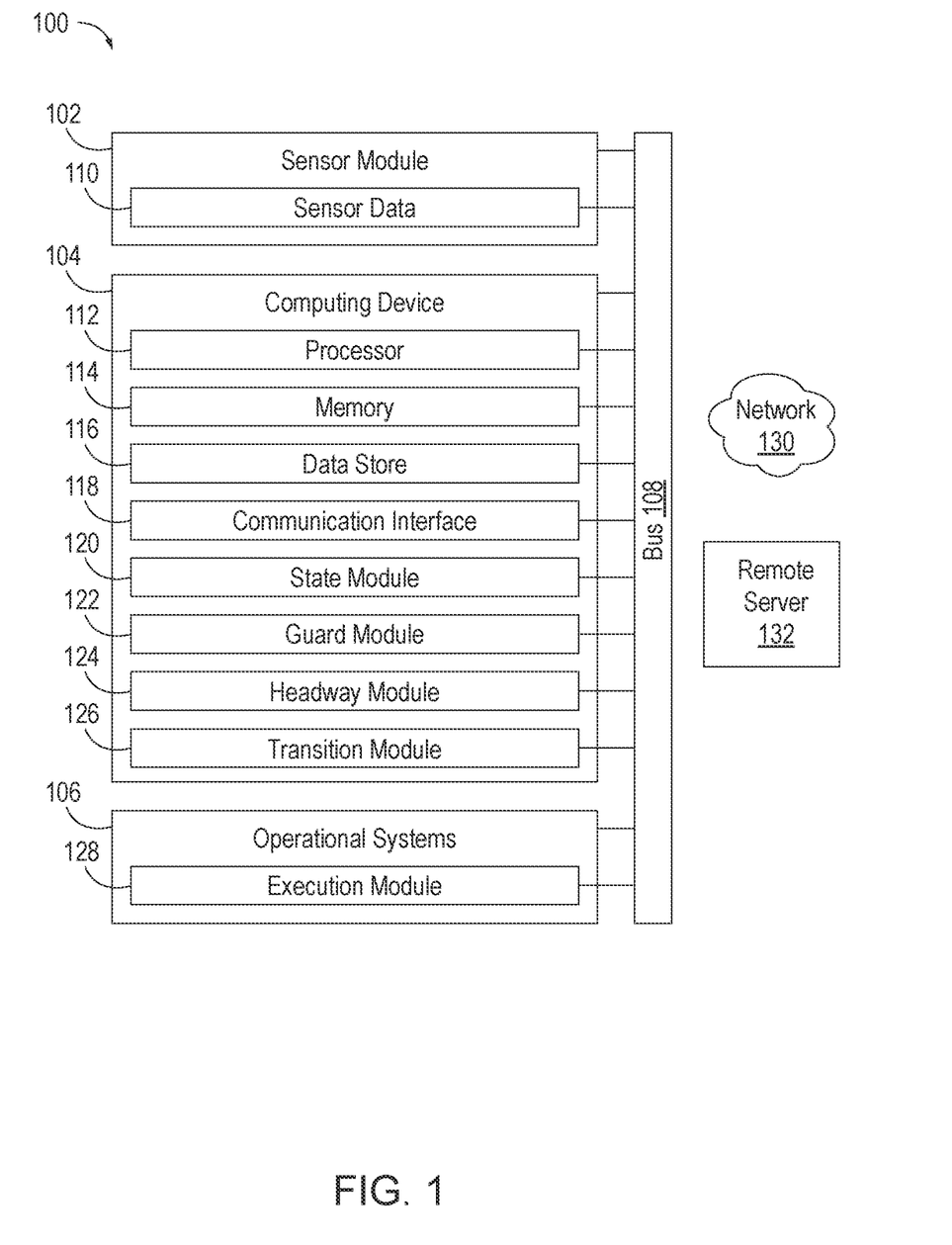
FIG. 1 is an exemplary component diagram of a system for speed and lane advisory, according to one aspect.

Referring now to the drawings, the drawings are for purposes of illustrating one or more exemplary embodiments and not for purposes of limiting the same. FIG. 1 is an exemplary component diagram of an operating environment 100 for speed and lane advisory, according to one aspect.

The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

Figure 2:
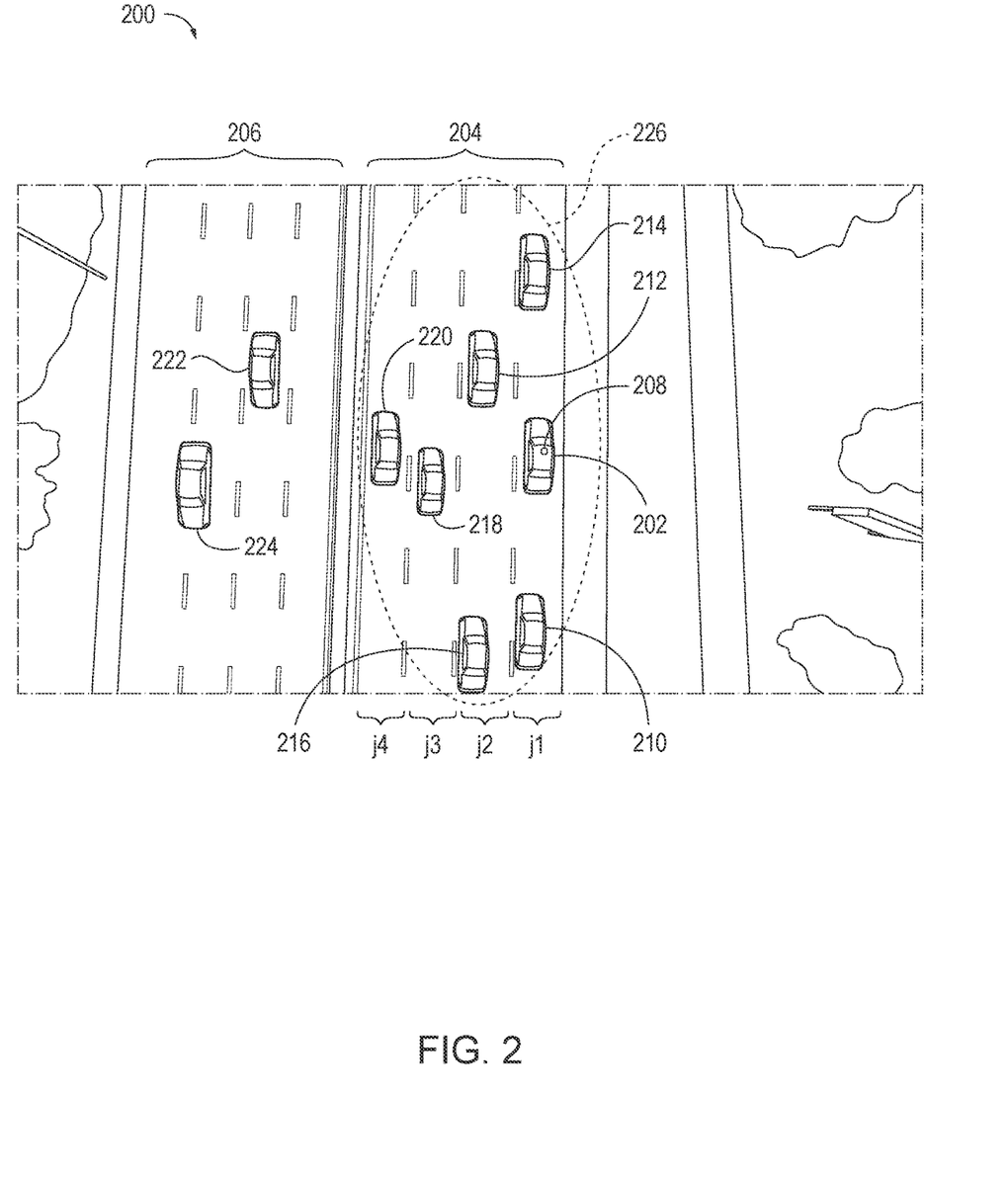
FIG. 2 is an exemplary agent environment for speed and lane advisory, according to one aspect.

The computing device 104 may be implemented as a part of a host agent, such as the host agent 202 of the roadway 200, shown in FIG. 2. The host agent 202 may be a bipedal, two-wheeled or four-wheeled robot, a vehicle, or a self-propelled machine. The host agent 202 may take the form of all or a portion of a robot. The computing device 104 may be implemented as part of a telematics unit, a head unit, a navigation unit, an infotainment unit, an electronic control unit, among others of the host agent 202. In other embodiments, the components and functions of the computing device 104 may be implemented with other devices (e.g., a portable device) or another device connected via a network (e.g., a network 130).

The roadway 200 may be any type of road, highway, freeway, or travel route. The roadway 200 may include traffic traveling in opposing longitudinal directions. For example, the roadway 200 may include a first segment 204 traveling in a first longitudinal direction and a second segment 206 traveling in a second longitudinal direction opposite the first longitudinal direction. The first segment 204 and the second segment 206 may have any number of lanes. For example, the first segment 204 may include four lanes, namely, a first lane $j_1$, a second lane $j_2$, a third lane $j_3$, and a fourth lane $j_4$, with agents traveling in the same longitudinal direction. The lanes $j_1$-$j_4$ have a path shape that is a line that may be straight, curved, have turns, etc. The roadway 200 may have various configurations not shown in FIG. 2 and may have any number of lanes. In one embodiment, the host agent 202 may be driving in first lane, $j_1$, following the trajectory of the path shape.

The host agent 202 may include sensors for sensing objects and features of the roadway 200 including other agents. For example, the host agent 202 may include one or more sensor(s) 208. The one or more sensor(s) 208 may include a camera 402, a light detection and ranging (LIDAR) sensor 404, radar 406, inertial measurement unit (IMU) 408, map 410, global navigation satellite system (GNSS) 412, or transceiver 414 as shown in the system architecture 400 of FIG. 4. For example, the camera 402 or LIDAR sensor 404 may capture light data from around the host agent 202. For example, a sensor of the one or more sensor(s) 208 may rotate 360° degrees around host agent 202 and collect the sensor data 110 in sweeps. Conversely, a sensor of the one or more sensor(s) 208 may be omnidirectional and collect sensor data 110 from all directions simultaneously. The one or more sensor(s) 208 of an agent may emit one or more laser beams of ultraviolet, visible, or near infrared light toward the surrounding environment of the host agent 202.

In addition to the host agent 202, a number of proximate agents may also be travelling along the roadway 200, including, a first proximate agent 210, a second proximate agent 212, a third proximate agent 214, a fourth proximate agent 216, a fifth proximate agent 218, a sixth proximate agent 220, a seventh proximate agent 222, and an eighth proximate agent 224, although it is appreciated that any number of agents may be present on the roadway 200. The systems and methods will be described with respect to the host agent 202 for clarity. However, any or all of the proximate agents 210-224 may also act as host agents.

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The one or more sensor(s) 208 may positioned on the host agent 202. For example, suppose that the host agent 202 is a vehicle. One or more sensors may be positioned at external front and/or side portions of the host agent 202, including, but not limited to different portions of the agent bumper, agent front lighting units, agent fenders, and the windshield. Additionally, the sensors may be disposed at internal portions of the host agent 202 including, in a vehicular embodiment, the agent dashboard (e.g., dash mounted camera), rear side of an agent rear view mirror, etc. Sensors may be positioned on a planar sweep pedestal (not shown) that allows the one or more sensor(s) 208 to be rotated to capture images of the environment at various angles.

The sensors, such as the one or more sensor(s) 208 and/or the sensor module 102 are operable to sense a measurement of data associated with the host agent 202, the operating environment 100, the roadway 200, and/or the operational systems 106 and generate a data signal indicating said measurement of data. These data signals may be converted into other data formats (e.g., numerical) and/or used by the sensor module 102, the computing device 104, and/or the operational systems 106 to generate sensor data 110 including data metrics and parameters. The sensor data 110 may be received by the sensor module 102 as an input image.

The sensor range of the sensors may be determined based on the ability of the sensor to receive sensor data 110. For example, the sensor range of the one or more sensor(s) 208 may be the distance (e.g., 100 yards, 500 yards, 750 yards, etc.) from which the one or more sensor(s) 208 may receive the sensor data 110 from the physical environment, such as the roadway 200. The sensor range may additionally or alternatively be based on the distance from sensors that the sensor module 102 is able to resolve the sensor data 110. The sensor range may define an agent population 226 that includes the host agent 202 and the proximate agents 210-220 within sensor range of the host agent 202.

The computing device 104 includes a processor 112, a memory 114, a data store 116, and a communication interface 118, which are each operably connected for computer communication via a bus 108 and/or other wired and wireless technologies. The communication interface 118 provides software and hardware to facilitate data input and output between the components of the computing device 104 and other components, networks, and data sources.

Figure 4:
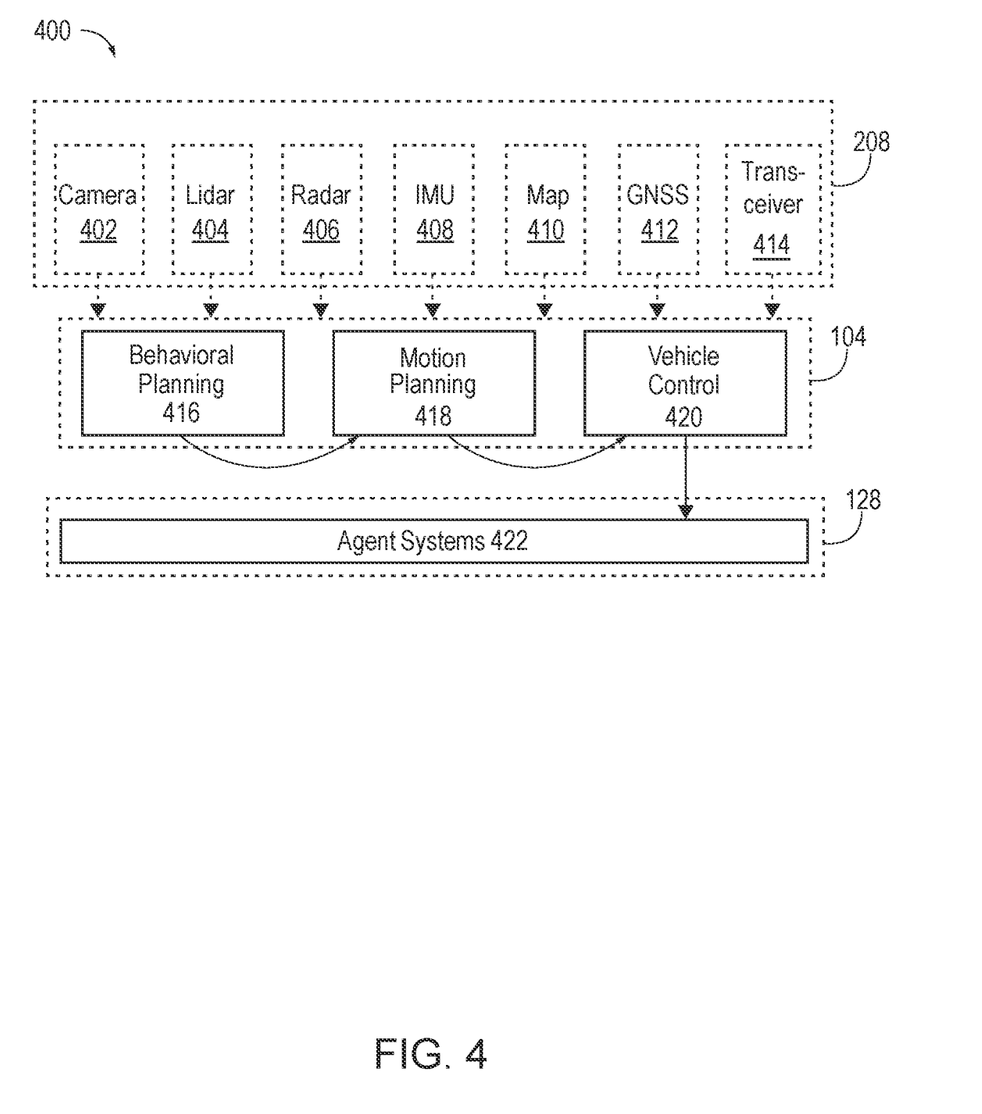
FIG. 4 is an exemplary system architecture for speed and lane advisory, according to one aspect.

In one embodiment, the communication interface 118 may exchange data and/or transmit messages with the proximate agents 210-224 and/or devices via a transceiver 414 or other communication hardware and protocols. For example, a transceiver 414 may exchange data with the first proximate agent 210 via a remote transceiver 414 of the first proximate agent 210. In some embodiments, the host agent 202 and first proximate agent 210 may also exchange data (e.g., agent data as described herein) over remote networks by utilizing a wireless network antenna, roadside equipment, and/or the communication network (e.g., a wireless communication network), or other wireless network connections in sensor range of the communicating agents. For example, if the host agent 202 includes the transceiver 414, the proximate agent, such as the first proximate agent 210 is within sensor range of the host agent 202 to exchange data.

As mentioned above, in some embodiments, data transmission may be executed at and/or with other infrastructures and servers. For example, the communication interface 118 may transmit and receive information, such as roadway data or agent data, directly or indirectly to and from a remote server 132 over the network 130. The remote server 132 may include similar components as the computing device 104 such as a remote processor, a remote memory, and a remote communication interface that are configured to be in communication with one another.

Alternatively, the proximate agents 210-224 may communicate by way of remote networks, such as a wireless network antenna and/or roadside equipment. For example, if the third proximate agent 214 is out of sensor range of the host agent 202, then another proximate agent, such as the second proximate agent 212, may relay sensor data or messages to the host agent 202. In another embodiment, the out of range agents may communicate with the host agent via a cellular network using the wireless network antenna.

Referring back to the computing device 104, a state module 120, a guard module 122, a headway module 124, and a transition module 126 for parameter prediction may be included for agent modeling facilitated by the components of the operating environment 100. The state module 120, the guard module 122, the headway module 124, and/or the transition module 126, may incorporate machine learning. For example, the state module 120, the guard module 122, the headway module 124, and/or the transition module 126 may use a neural network such as the Neural Networks integrated Model Predictive Control (NNMPC).

The computing device 104 is also operably connected for computer communication (e.g., via the bus 108 and/or the communication interface 118) to one or more operational systems 106. For example, as shown in the system architecture 400 of FIG. 4, the state module 120, the guard module 122, the headway module 124, and/or the transition module 126, may perform behavior planning 416 and motion planning 418 to provide agent control 420 of the host agent 202. The operational systems 106 may include, but are not limited to, any automatic or manual systems that may be used to enhance the operation and/or safety of the host agent 202.

The operational systems 106 include an execution module 128. The execution module 128 monitors, analyses, and/or operates the host agent 202, to some degree. For example, the execution module 128 may store, calculate, and provide directional information and facilitate features like vectoring and obstacle avoidance among others based on information from the computing device 104. In a vehicular embodiment, the behavioral planning 416 for the host agent 202 may identify a lane change maneuver utilizing the state module 120, the guard module 122, the headway module 124, and/or the transition module 126 of the computing device 104. In response to the behavioral planning 416, the computing device 104 may perform motion planning 418. The execution module 128 may cause the host agent 202 to execute the lane change maneuver based on the motion planning 418. For example, the agent systems 422 may include a steering system, that cause the host agent 202 to steer autonomously. The operational systems 106 may be dependent on the implementation. The execution module 128 may be a Proportional, Integral, Derivative (PID) controller. Continuing the vehicular embodiment described above, the execution module 128 may be a longitudinal PID controller.

The operational systems 106 also include and/or are operably connected for computer communication to the sensor module 102. For example, one or more sensors of the sensor module 102, such as the one or more sensor(s) 208, may be incorporated with execution module 128 to monitor characteristics of the environment of the host agent 202 or the host agent 202 itself. For example, in the vehicular embodiment, the one or more sensor(s) 208 may be incorporated with execution module 128 to monitor characteristics of the roadway 200. Suppose that the execution module 128 is facilitating the host agent 202 traversing the roadway 200 to confirm that agents present on the roadway 200 are behaving as expected.

The sensor module 102, the computing device 104, and/or the operational systems 106 are also operatively connected for computer communication to the network 130. The network 130 is, for example, a data network, the Internet, a wide area network (WAN) or a local area (LAN) network. The network 130 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Lane Advisory

Figure 3:
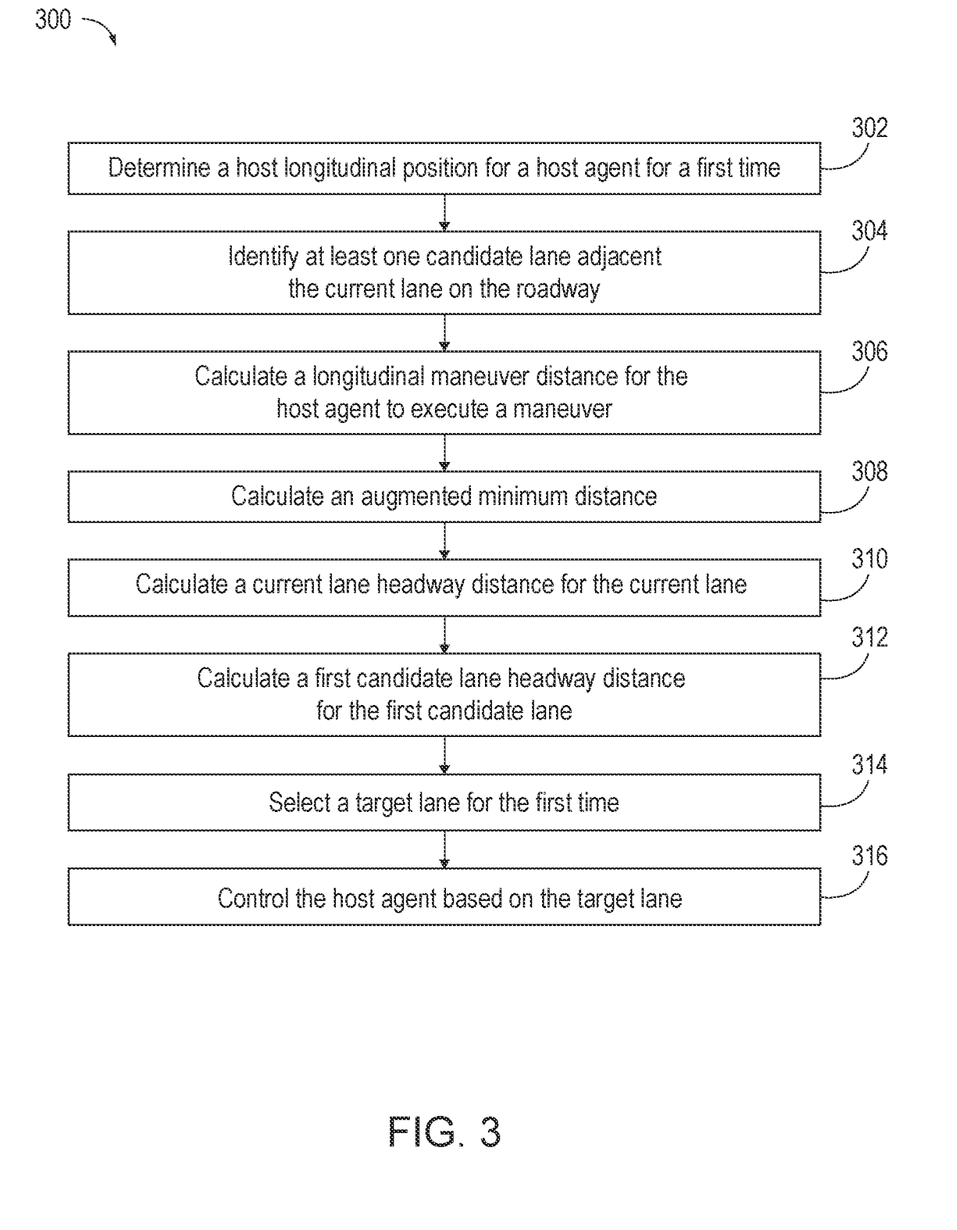
FIG. 3 is an exemplary process flow of a method for speed and lane advisory, according to one aspect.

Referring now to FIG. 3, a method 300 for lane and speed advisory will now be described according to an exemplary embodiment. FIG. 3 will also be described with reference to FIGS. 1, 2, 4, and 5. For simplicity, the method 300 will be described as a sequence of elements, but it is understood that the elements of the method 300 may be organized into different architectures, blocks, stages, and/or processes.

At block 302, the method 300 includes a state module 120 determining a host longitudinal position for a host agent 202 for a first time. The host agent 202 is a member of an agent population 226 on the roadway 200. The members of the agent population 226 are traveling on the roadway 200 in the longitudinal direction of the host agent 202. For example, the host agent 202 is traveling on the first segment 204 in a first longitudinal direction. Because the seventh proximate agent 222 and the eighth proximate agent 224 are traveling on the second segment 206 in a second longitudinal direction, the seventh proximate agent 222 and the eighth proximate agent 224 are not included in the agent population 226. Additionally, the members of the agent population 226 may also be in sensor range of the host agent 202.

The host longitudinal position is the predicted position of the host agent 202 in the current lane. In the vehicular embodiment show in FIG. 2, the host agent 202 is traveling in the first lane, $j_1$, at a current time. Accordingly, the first lane, $j_1$, is the current lane of the host agent 202. Therefore, the host longitudinal position is a position in the first lane, $j_1$, one-time step in the future from a current time. For example, if the time step has a duration of one second, then the first time may be a one second after the current time.

In some embodiments, the method 300 may be performed iteratively. Accordingly, the host longitudinal position may be determined for a first time, one-time step after the current time, and again the host longitudinal position may be determined for a second time, one-time step after the first time, and so on. In some embodiments, the method 300 may performed with respect to a planning horizon. The planning horizon may include a predetermined number of time steps. For example, at the current time, the host longitudinal position may be determined for a planning horizon that includes forty (40) time steps into the future, such that the host longitudinal position of the host agent 202 is predicted for the first time, the second time, and so on to the fortieth time of the planning horizon. The host longitudinal position may be predicted based on the sensor data 110 from the one or more sensor(s) 208, for example, the IMU 408, the map 410, or GNSS 412, shown in the system architecture 400 of FIG. 4, that indicates the speed and/or location of the host agent 202.

At block 304, the method 300 includes the state module 120 identifying at least one candidate lane adjacent the current lane on the roadway 200. A candidate lane is another travel route parallel and adjacent the current lane. For example, because, the first lane, $j_1$, is the current lane of the host agent 202, the second lane, $j_2$, is a first candidate lane for the host agent 202. The third lane, $j_3$, is not a candidate lane for the host agent 202 because the first lane, $j_1$, and the third lane, $j_3$, are separated by the second lane, $j_2$. In a robotic implementation, the candidate lane may be a predetermined travel path that is adjacent to the travel path currently being traversed by the host agent 202.

Candidate lanes are also travel routes that travel in the same longitudinal direction as the current lane. A shoulder of the roadway 200 is not a candidate lane even though it is adjacent the first lane, $j_1$, because it is not a travel route for traffic. Likewise, a lane in the second segment 206 is not a candidate lane for the fourth lane, $j_4$, because the traffic of the second segment 206 travels in a longitudinal direction opposite to that of the first segment 204. There may be more than one candidate lane. For example, if the host agent 202 was traveling in the second lane, $j_2$, then the first lane, $j_1$, may be a first candidate lane and the third lane, $j_3$, may be a second candidate lane of the at least one candidate lane.

The state module 120 may identify at least one candidate lane based on the sensor data 110. The sensor data 110 may be received from the one or more sensor(s) 208. The sensor data 110 may include a video sequence or a series of images, user inputs, and/or data from the operational systems 106. The sensor data 110 may include radar units, lidar units, image capture components, sensors, cameras, scanners (e.g., 2-D scanners or 3-D scanners), or other measurement components. The sensor module 102 or the state module 120 may identify at least one candidate lane based on roadway features (e.g., signs, roadway markings, etc.), the travel patterns of observed agents, and/or received roadway information.

As discussed above, the at least one candidate lane may be identified for host agent 202 based on the predicted host longitudinal position at each of the times in the planning horizon. Continuing the example from above, at the current time, the state module 120 may identify the at least one candidate lane for the host agent 202 for the first time, the second time, and so on to the fortieth time of the planning horizon.

At block 306, the method 300 includes the guard module 122 calculating a longitudinal maneuver distance for the host agent 202 to execute a maneuver from the current lane to a candidate lane of the at least one candidate lane based on a speed of the host agent 202 and a duration of the time step. In one example, the guard module 122 may use a moving average filter coupled with a rounding function to model the time it takes to change the lane by the host agent 202. This may be represented as follows:

$$s_0(k) = s_0(k-1) + \frac{v_0(k-1) + v_0(k)}{2} \cdot T_s$$

-continued $$l_0(k) = \left\lfloor \frac{1}{N} \sum_{i=1}^{N-1} \mathcal{L}(k-1) + \frac{1}{2} \right\rfloor$$

where $s_0(k)$, $v_0(k)$, $l_0(k)$ and $\mathcal{L}(k)$ denote the host longitudinal position, velocity of the host agent 202, a lane indicator and a candidate lane, respectively, at time instant k; the subscript i indexes the vehicles on the roadway 200. For example, the host agent 202 may be indexed with 0, the first proximate agent 210 may be indexed with 1, the second proximate agent 212 may be indexed with 2 and so on. $T_s$ denotes the discretization time step and N corresponds to the number of time steps required to change lanes from the current lane to the candidate lane.

Because the candidate lanes are adjacent the current lane, each of the lanes of the roadway 200 are not modeled. Accordingly, the integer variables are replaced with binary variables, as follows:

$$\forall_i \in \mathbb{L}(k), \forall_j \in \mathbb{Z}_{[1,H]}: \tilde{\mathcal{L}}^k(i,j) \in \{0,1\}$$

where the $\tilde{\mathcal{L}}^k(i, j)$ represents a binary candidate lane variable, indexed by the lane (i) as well as the planning step (j) and $\tilde{\mathcal{L}}^k(a, b)=1$ represents the choice of lane $a \in \mathbb{L}$, as the candidate lane at the given time step $b \in \mathbb{Z}_{[1,H]}$.

Because the candidate lanes do not necessarily include each of the lanes of the roadway 200, but rather those adjacent the current lane, the identified candidate lanes may be identified using a binary variable, represented as:

$$\rightarrow \tilde{\mathcal{L}}^k(a, j) = 1 \Rightarrow \sum_{b \in \mathbb{B}(k)} \tilde{\mathcal{L}}^k(b, j) = 1$$

$$\mathbb{B}(k) = \mathbb{Z}_{[a-1,a+1]} \cap \mathbb{L}(k)$$

The longitudinal maneuver distance $\gamma_d(\delta^k(j))$ is the dynamic cost of deviation from the current lane or previous lane in an iterative embodiment applied for the first N steps of the planning horizon. In one embodiment, the longitudinal maneuver distance $\gamma_d(\delta^k(j))$ may be given by:

$$\gamma_d(\delta^k(j)) = \gamma_4 \cdot \frac{2|\delta^k(j)|}{L_l}$$

where $L_l$ is the width of the at one candidate lane. In a lane change embodiment in which the maneuver is a lane change maneuver, the host agent 202 is considered to have changed lanes once the host agent 202 crosses a lane boundary. The deviation $\delta^k(j)$ is considered from the lane boundary instead of the center of the candidate lane to maintain the continuity of $\gamma_d(\delta^k(j))$ with respect to the lateral displacement of the host agent 202. Accordingly, the longitudinal maneuver distance is based on a lateral distance from the current lane to a boundary of the candidate lane of the at least one candidate lane. In other embodiments, the longitudinal maneuver distance $\gamma_d(\delta^k(j))$ may be given by different heuristics. For example, the longitudinal maneuver distance $\gamma_d(\delta^k(j))=1$ to indicate that the host agent 202 is in a target lane from a previous time step. The longitudinal maneuver distance $\gamma_d(\delta^k(j))$ is included in the augmented minimum distance to accommodate time to complete a maneuver (N), such as the lane change maneuver. Accordingly, the longitudinal maneuver distance $\gamma_d(\delta^k(j))$ may be calculated for each of the time steps of the planning horizon.

At block 308, the method 300 includes the guard module 122 calculating an augmented minimum distance by combining a predetermined minimum distance and the longitudinal maneuver distance. The augmented minimum distance is the minimum distance that the host agent 202 is to maintain between the host agent 202 and the closest proximate vehicle in the current lane of the host agent 202. For example, if the first proximate agent 210 is the closest agent in the current lane to the host agent 202, the host agent 202 maintains the augmented minimum distance with the first proximate agent 210. Because the host agent 202 maintains the augmented minimum distance with the closest proximate agent in the current lane, the host agent 202 maintains the augmented minimum distance with each of the proximate agents of the agent population 226 that are traveling in the current lane.

The augmented minimum distance, $\tilde{\mathcal{L}}_i^s(j)$ is then calculated based on N time steps of the planning horizon.

$$\tilde{\mathcal{L}}_i^s(j) = \mathcal{L}_i^s(j) + \gamma_d(\delta^k(j)) \cdot (v_i^k(j) \cdot N \cdot T_s).$$

At block 310, the method 300 includes the headway module 124 calculating a current lane headway distance for the current lane based on a presence of a current lane preceding proximate agent in the current lane and the augmented minimum distance. A current lane preceding proximate agent is an agent directly ahead of the host agent 202 in the current lane. For example, the third proximate agent 214 precedes the host agent 202 in the first lane, $j_1$, without intervening agents in the first lane, $j_1$. Accordingly, the third proximate agent 214 is the current lane preceding proximate agent.

The presence of a proximate agent in a lane of the roadway may be determined based on the agent population 226. Because the members of the agent population 226 include agents within sensor range of the host agent 202, if a proximate agent is not with in the sensor range of the host agent 202, then the headway module 124 may determine that a proximate agent is not present. For example, if the host agent 202 is in the position of the sixth proximate agent 220, there is not a preceding proximate agent as there is no preceding vehicle in the agent population 226. Accordingly, the current lane headway distance for the current lane may be defined as unbounded.

The headway module 124 may identify the current lane preceding proximate agent based on sensor data from the sensor(s) 208. For example, the proximate longitudinal position may be predicted based on the sensor data 110 from the one or more sensor(s) 208, for example, the IMU 408, the map 410, or GNSS 412, shown in the system architecture 400 of FIG. 4. In another manner, the headway module 124 may query members of the agent population 226 to determine the presence of the current lane preceding proximate agent. In some embodiments, members of the agent population 226 may communicate via transceivers. The transceiver 414 may be a radio frequency (RF) transceiver used to receive and transmit information to and from the remote server 132. In some embodiments, the communication interface 118 may receive and transmit information to and from the remote server 132, such as sensor data 110. In some embodiments, the remote server 132 may be linked to members of the agent population 226, other entities, traffic infrastructures, and/or devices through a network connection, such as via the wireless network antenna, the roadside equipment, and/or other network connections.

In response to determining that a current lane preceding proximate agent is present, the headway module 124 may calculate a current lane headway distance for the current lane. For example, the headway module 124 may determine the proximate longitudinal position for the current lane preceding proximate agent at the first time. The proximate longitudinal position is the predicted position of the current lane preceding proximate agent in the current lane. As discussed above, the third proximate agent 214 is the current lane preceding proximate agent. Therefore, in this example, the proximate longitudinal position is a predicted position of the third proximate agent 214 in the first lane, $j_1$, one-time step in the future.

While described with respect to one-time step, the proximate longitudinal position of the current lane preceding proximate agent may be determined for H time steps of the planning horizon. For example, at the current time, the proximate longitudinal position may be determined for the planning horizon, such that the proximate longitudinal position of the current lane preceding proximate agent, here the third proximate agent 214, is predicted for the first time, the second time, and so on to the fortieth time of the planning horizon.

For example, at a given time step k, the estimated acceleration $(\bar{a}_i^k)$ and the estimated velocity $(\bar{v}_i^k)$ parameters may be calculated based on the sensor data 110. The headway module may then estimate future velocity and proximate longitudinal position of a preceding proximate agent according to:

$$\hat{v}_i^k(j) = \begin{cases} \bar{v}_i^k, & j = 0 \\ \hat{v}_i^k(j-1) + \bar{a}_i^k \cdot j, & 0 < j \le H_a \\ \hat{v}_i^k(j-1), & j > H_a \end{cases}$$

$$\hat{s}_i^k(j) = \begin{cases} s_i(k), & j = 0 \\ \hat{s}_i^k(j-1) + \frac{T_s}{2} \cdot (\hat{v}_i^k(j-1) + \hat{v}_i^k(j)), & j > 0 \end{cases}$$

where $H_a$ corresponds to the acceleration horizon while $\hat{v}_i^k(j)$ and $\hat{s}_i^k(j)$ respectively represent the predicted velocity and proximate longitudinal position for the preceding proximate agent, here, the third proximate agent 214.

The current lane headway distance for the current lane may be based on a differential longitudinal distance defined between the proximate longitudinal position of the current lane preceding proximate agent and the host longitudinal position. For example, the headway module 124 may calculate a current lane differential longitudinal distance between the host longitudinal position and a proximate longitudinal position of the current lane preceding proximate agent. Accordingly, the current lane differential longitudinal distance is the distance between the predicted positions of the host agent 202 and the current lane preceding proximate agent at the first time.

The current lane headway distance is further based on the augmented minimum distance. For example, the current lane differential longitudinal distance may be combined with the augmented minimum distance. Continuing the example from above, the current lane headway distance represents the predicted relative difference in position between the third proximate agent 214 and the host agent 202 in terms of the augmented minimum distance.

At block 312, the method 300 includes the headway module 124 calculating a first candidate lane headway distance for the first candidate lane based on a presence of a first candidate preceding proximate agent in the first candidate lane and the augmented minimum distance. The presence of a first candidate preceding proximate agent may be determined in a similar manner as described above with respect to determining the presence of the current lane preceding proximate agent. For example, the headway module 124 may make the determination based on the sensor data 110 regarding the agent population 226.

The first candidate lane headway distance for the first candidate lane may be based on a differential longitudinal distance defined between the proximate longitudinal position of the first candidate lane preceding proximate agent and the host longitudinal position. For example, the second proximate agent 212 precedes the host agent 202 in the second lane, $j_2$, without intervening agents between the longitudinal position of the host agent 202 and the second proximate agent 212 in the second lane, $j_2$. Accordingly, the second proximate agent 212 is the first candidate lane preceding proximate agent.

The headway module 124 may calculate the first candidate lane headway distance includes calculating a first candidate lane differential longitudinal distance between the host longitudinal position and a proximate longitudinal position of the first candidate lane preceding proximate agent. Accordingly, the first candidate lane differential longitudinal distance is the distance between the predicted positions of the host agent 202 and the first candidate lane preceding proximate agent, in this example the second proximate agent 212, at the first time. In addition to the first time, the first candidate lane headway distance for each of the time steps of the planning horizon. Furthermore, the first candidate lane differential longitudinal distance may be combined with the augmented minimum distance.

In an embodiment, with a second candidate lane of the at least one candidate lane, the headway module 124 may calculate a second candidate lane headway distance for the second candidate lane based on a presence of a second candidate preceding proximate agent in the second candidate lane and the augmented minimum distance. The presence of a second candidate preceding proximate agent may be determined in a similar manner as described above with respect to determining the presence of the current lane preceding proximate agent and the first candidate preceding proximate agent.

At block 314, the method 300 includes the headway module 124 selecting the current lane or the at least one candidate lane for the first time based on a comparison of the current lane headway distance and the first candidate lane headway distance. For example, the headway module 124 may select a target lane based on the lane that has the larger headway distance. For example, if the current lane headway distance is larger than the first candidate lane headway distance, then the current lane may be selected lane. Alternatively, if the first candidate lane headway distance is larger than the current lane headway distance, the first candidate lane is selected as the target lane.

At block 316, the method 300 includes the transition module 126 causing the host agent 202 to be controlled based on the selection of the target lane. For example, the computing device 104 may perform motion planning 418 in response to the selection of the target lane for the first time. For example, In one embodiment, the host agent 202 may broadcast or transmit a communication to one or more members of the agent population 226 via the network 130. The communication may be a V2V message broadcast at a frequency and include information regarding the motion planning 418 of the host agent 202. The communication may be broadcast or transmitted without any manual user or driver intervention from the driver of the host agent 202 to start or stop the transmission of the V2V messages and/or associated information.

In another embodiment, the operational systems 106 and/or the execution module 128 may cause the host agent 202 to perform a maneuver. In the vehicular embodiment, the operational systems 106 may communicate with agent systems 422 to cause the host agent 202 to engage in the maneuver, such as a lane change maneuver, turn signal operation, a steering operation, a braking operation, an acceleration operation, a horn operation, etc. For example, if the maneuver is a lane change maneuver, the transition module 126 may cause the host agent 202 to motion plan 418 in the target lane at the first time.

Again, while described with specificity to a first time for clarity, the method 300 may be performed iteratively. For example, the state module 120 may determine a next host longitudinal position for the host agent 202 for a second time. The second time is a time step after the first time. If the host agent 202 moves to the target lane at block 316 at the first time, then the target lane is the current lane of the host agent. Accordingly, the state module 120 may identify at least one candidate lane adjacent to the target lane on the roadway 200. For example, if the host agent 202 moved to the second lane, $j_2$, at the first time, then the at least one candidate lane includes a first candidate lane, $j_1$, and the third lane, $j_3$.

A longitudinal maneuver distance for the host agent to execute a maneuver from the target lane to a candidate lane of the at least one candidate lane based on the speed of the host agent and a duration of the time step. The augmented minimum distance may be calculated based on the target lane and the candidate lane corresponding to the target lane in a similar manner as described above with respect to blocks 306 and 308. A target lane headway distance for the target lane based on a presence of a target lane preceding proximate agent in the target lane and the augmented minimum distance in a similar manner as described above with respect to block 310. A first candidate lane headway distance for the first candidate lane based on a presence of a first candidate preceding proximate agent in the first candidate lane relative to the target lane and the augmented minimum distance in a similar manner as described above with respect to block 312. Accordingly, the headway module 124 may select a next target lane from a target lane or a candidate lane of the at least one candidate lane for the first time based on a comparison of the target lane headway distance and the first candidate lane headway distance. The host agent 202 is then controlled based on the selection of the next target lane. In this manner, the systems and methods described herein may be performed any number of time steps, yielding a long planning horizon.

Furthermore, because the at least on candidate lane is a binary candidate lane variable such that the host agent 202 may remain in the current lane or move to an adjacent candidate lane, the computational complexity of modeling a number of agents on a multi-lane roadway is reduced. The long planning horizon for the strategic decision-making gives the host agent 202 the ability to proactively anticipate and handle challenging driving situations without becoming bogged down in computational complexity.

In some embodiments, the method 300 may be performed for N number of time steps from the current time in a f, then the method 300 may be performed for N number of time steps from the first time. To further reduce computational complexity, some of the results from the first iteration may be used in the second iteration. For example, solutions from the first iteration may be used, such as $v^{k-1}$ and $\mathcal{L}^{k-1}$ where k is the time step for the current iteration, in this example the second iteration, and k−1 is the previous time step from the previous iteration, here the first iteration.

Still another aspect involves a computer-readable medium including processor-executable instructions configured to implement one aspect of the techniques presented herein. An aspect of a computer-readable medium or a computer-readable device devised in these ways includes a computer-readable medium, such as a CD-R, DVD-R, flash drive, a platter of a hard disk drive, etc., on which is encoded computer-readable data. This encoded computer-readable data, such as binary data including a plurality of zero's and one's, in turn includes a set of processor-executable computer instructions configured to operate according to one or more of the principles set forth herein. The processor-executable computer instructions may be configured to perform a method, such as the method 300 of FIG. 3. In another aspect, the processor-executable computer instructions may be configured to implement a system, such as the operating environment 100 of FIG. 1 or the system architecture 400 of FIG. 4. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for speed and lane advisory, comprising:
a memory storing instructions that when executed by a processor cause the processor to:
determine a host longitudinal position for a host agent for a first time, wherein the host agent is traveling in a current lane of a roadway, and wherein the first time is a time step after a current time;
identify at least one candidate lane adjacent to the current lane on the roadway, wherein the at least one candidate lane travels in a same longitudinal direction as the current lane, and wherein the at least one candidate lane includes a first candidate lane;
calculate a longitudinal maneuver distance for the host agent to execute a maneuver from the current lane to a candidate lane of the at least one candidate lane based on a speed of the host agent and a duration of the time step;
calculate an augmented minimum distance by combining a predetermined minimum distance and the longitudinal maneuver distance;
calculate a current lane headway distance for the current lane based on a presence of a current lane preceding proximate agent in the current lane and the augmented minimum distance;
calculate a first candidate lane headway distance for the first candidate lane based on a presence of a first candidate preceding proximate agent in the first candidate lane and the augmented minimum distance;
select a target lane from a current lane or a candidate lane of the at least one candidate lane for the first time based on a comparison of the current lane headway distance and the first candidate lane headway distance; and
control the host agent based on the target lane, wherein the at least one candidate lane is a binary candidate lane variable.

2. The system for speed and lane advisory of claim 1, wherein the at least one candidate lane further includes a second candidate lane, and wherein the instructions, when executed by the processor further cause the processor to:

calculate a second candidate lane headway distance for the second candidate lane based on a presence of a second candidate preceding proximate agent in the second candidate lane and the augmented minimum distance, wherein the target lane is selected based on the comparison of the current lane headway distance, the first candidate lane headway distance, and the second candidate lane headway distance.

3. The system for speed and lane advisory of claim 1, wherein calculating the current lane headway distance includes the instructions, when executed by the processor further cause the processor to:
calculate a current lane differential longitudinal distance between the host longitudinal position and a proximate longitudinal position of the current lane preceding proximate agent; and
combine the current lane differential longitudinal distance with the augmented minimum distance.

4. The system for speed and lane advisory of claim 1, wherein calculating the first candidate lane headway distance includes the instructions, when executed by the processor further cause the processor to:
calculate a first candidate lane differential longitudinal distance between the host longitudinal position and a proximate longitudinal position of the first candidate lane preceding proximate agent; and
combine the first candidate lane differential longitudinal distance with the augmented minimum distance.

5. The system for speed and lane advisory of claim 1, wherein the longitudinal maneuver distance is based on a lateral distance from the current lane to a boundary of the candidate lane of the at least one candidate lane.

6. The system for speed and lane advisory of claim 1, wherein the instructions, when executed by the processor further cause the processor to:
determine a next host longitudinal position for the host agent for a second time, wherein the host agent is traveling in the target lane of the roadway, and wherein the second time is another time step after the first time;
identify a second time at least one candidate lane adjacent to the target lane on the roadway, wherein the second time at least one candidate lane includes a second time first candidate lane;
calculate a second time longitudinal maneuver distance for the host agent to execute a maneuver from the target lane to a second time candidate lane of the second time at least one candidate lane based on the speed of the host agent and a duration of the another time step;
calculate a second time augmented minimum distance by combining the predetermined minimum distance and the second time longitudinal maneuver distance;
calculate a target lane headway distance for the target lane based on a presence of a target lane preceding proximate agent in the target lane and the second time augmented minimum distance;
calculate a second time first candidate lane headway distance for the second time first candidate lane based on a presence of a second time first candidate preceding proximate agent in the second time first candidate lane and the second time augmented minimum distance;
select a next target lane from a secondary target lane or a secondary candidate lane of the second time at least one candidate lane for the second time based on a comparison of the target lane headway distance and the second time first candidate lane headway distance; and
control the host agent based on the next target lane.

7. The system for speed and lane advisory of claim 1, wherein the maneuver is a lane change maneuver and wherein controlling the host agent includes causing the host agent to motion plan in the target lane at the first time.

8. The system for speed and lane advisory of claim 1, wherein
the determination of the host longitudinal position is based on sensor data from one or more sensors of the host agent,
the identification of the at least one candidate lane is based on the sensor data,
the presence of the current lane preceding proximate agent and the first candidate preceding proximate agent is determined based on the sensor data, and
the control of the host agent is performed through directive communication, via a communication interface, to operational systems of the host agent.

9. A method for speed and lane advisory, comprising:
determining a host longitudinal position for a host agent for a first time, wherein the host agent is traveling in a current lane of a roadway, and wherein the first time is a time step after a current time;
identifying at least one candidate lane adjacent to the current lane on the roadway, wherein the at least one candidate lane travels in a same longitudinal direction as the current lane, and wherein the at least one candidate lane includes a first candidate lane;
calculating a longitudinal maneuver distance for the host agent to execute a maneuver from the current lane to a candidate lane of the at least one candidate lane based on a speed of the host agent and a duration of the time step;
calculating an augmented minimum distance by combining a predetermined minimum distance and the longitudinal maneuver distance;
calculating a current lane headway distance for the current lane based on a presence of a current lane preceding proximate agent in the current lane and the augmented minimum distance;
calculating a first candidate lane headway distance for the first candidate lane based on a presence of a first candidate preceding proximate agent in the first candidate lane and the augmented minimum distance;
selecting a target lane from a current lane or a candidate lane of the at least one candidate lane for the first time based on a comparison of the current lane headway distance and the first candidate lane headway distance; and
controlling the host agent based on the target lane, wherein
the at least one candidate lane is a binary candidate lane variable.

10. The method for speed and lane advisory of claim 9, further comprising:
calculating a second candidate lane headway distance for a second candidate lane, such that the at least one candidate lane further includes the second candidate lane, based on a presence of a second candidate preceding proximate agent in the second candidate lane and the augmented minimum distance, wherein the target lane is selected based on the comparison of the current lane headway distance, the first candidate lane headway distance, and the second candidate lane headway distance.

11. The method for speed and lane advisory of claim 9, wherein calculating the current lane headway distance comprises:
calculating a current lane differential longitudinal distance between the host longitudinal position and a proximate longitudinal position of the current lane preceding proximate agent; and
combining the current lane differential longitudinal distance with the augmented minimum distance.

12. The method for speed and lane advisory of claim 9, wherein calculating the first candidate lane headway distance comprises:
calculating a first candidate lane differential longitudinal distance between the host longitudinal position and a proximate longitudinal position of the first candidate lane preceding proximate agent; and
combining the first candidate lane differential longitudinal distance with the augmented minimum distance.

13. The method for speed and lane advisory of claim 9, wherein the maneuver is a lane change maneuver and wherein controlling the host agent includes causing the host agent to motion plan in the target lane at the first time.

14. The method for speed and lane advisory of claim 9, wherein
the determination of the host longitudinal position is based on sensor data from one or more sensors of the host agent,
the identification of the at least one candidate lane is based on the sensor data,
the presence of the current lane preceding proximate agent and the first candidate preceding proximate agent is determined based on the sensor data, and
the control of the host agent is performed through directive communication, via a communication interface, to operational systems of the host agent.

15. A non-transitory computer readable storage medium storing instructions that when executed by a computer having a processor to perform a method for speed and lane advisory, the method comprising:
determining a host longitudinal position for a host agent for a first time, wherein the host agent is traveling in a current lane of a roadway, and wherein the first time is a time step after a current time;
identifying at least one candidate lane adjacent to the current lane on the roadway, wherein the at least one candidate lane travels in a same longitudinal direction as the current lane, and wherein the at least one candidate lane includes a first candidate lane;
calculating a longitudinal maneuver distance for the host agent to execute a maneuver from the current lane to a candidate lane of the at least one candidate lane based on a speed of the host agent and a duration of the time step;
calculating an augmented minimum distance by combining a predetermined minimum distance and the longitudinal maneuver distance;
calculating a current lane headway distance for the current lane based on a presence of a current lane preceding proximate agent in the current lane and the augmented minimum distance;
calculating a first candidate lane headway distance for the first candidate lane based on a presence of a first candidate preceding proximate agent in the first candidate lane and the augmented minimum distance;
selecting a target lane from a current lane or a candidate lane of the at least one candidate lane for the first time based on a comparison of the current lane headway distance and the first candidate lane headway distance; and
controlling the host agent based on the target lane, wherein
the at least one candidate lane is a binary candidate lane variable.

16. The non-transitory computer readable storage medium implemented method of claim 15, further comprising:
calculating a second candidate lane headway distance for a second candidate lane, such that the at least one candidate lane further includes the second candidate lane, based on a presence of a second candidate preceding proximate agent in the second candidate lane and the augmented minimum distance, wherein the target lane is selected based on the comparison of the current lane headway distance, the first candidate lane headway distance, and the second candidate lane headway distance.

17. The non-transitory computer readable storage medium implemented method of claim 15, wherein calculating the current lane headway distance comprises:
calculating a current lane differential longitudinal distance between the host longitudinal position and a proximate longitudinal position of the current lane preceding proximate agent; and
combining the current lane differential longitudinal distance with the augmented minimum distance.

18. The non-transitory computer readable storage medium implemented method of claim 15, wherein calculating the first candidate lane headway distance comprises:
calculating a first candidate lane differential longitudinal distance between the host longitudinal position and a proximate longitudinal position of the first candidate lane preceding proximate agent; and
combining the first candidate lane differential longitudinal distance with the augmented minimum distance.

19. The non-transitory computer readable storage medium implemented method of claim 15, wherein the maneuver is a lane change maneuver and wherein controlling the host agent includes causing the host agent to motion plan in the target lane at the first time.

20. The non-transitory computer readable storage medium implemented method of claim 15, wherein
the determination of the host longitudinal position is based on sensor data from one or more sensors of the host agent,
the identification of the at least one candidate lane is based on the sensor data,
the presence of the current lane preceding proximate agent and the first candidate preceding proximate agent is determined based on the sensor data, and
the control of the host agent is performed through directive communication, via a communication interface, to operational systems of the host agent.

\* \* \* \* \*